United States Patent [19]

Taniura

[11] Patent Number: 4,998,260
[45] Date of Patent: Mar. 5, 1991

[54] METHOD FOR CORRECTING THE PATH OF A GAS LASER BEAM

[75] Inventor: Hiroshi Taniura, Ibaragi, Japan

[73] Assignee: Think Laboratory Co., Ltd., Chiba, Japan

[21] Appl. No.: 477,326

[22] Filed: Feb. 8, 1990

[30] Foreign Application Priority Data

Jul. 5, 1989 [JP] Japan .................... 1-173601

[51] Int. Cl.$^5$ .............................................. H01S 3/08
[52] U.S. Cl. ...................................... 372/107; 372/108; 356/152
[58] Field of Search ....................... 372/109, 108, 107; 356/152, 153

[56] References Cited

U.S. PATENT DOCUMENTS 4,144,505  3/1979  Angelbeck et al. ................. 372/107
4,146,329  3/1979  King et al. ........................... 372/107
4,283,688  9/1981  Lloyd et al. ......................... 372/107

Primary Examiner—Léon Scott, Jr.
Attorney, Agent, or Firm—Koda & Androlia

[57] ABSTRACT

A method for correcting the path of a gas laser beam by reflecting the beam with a first mirror, further reflecting such reflected beam with a second mirror, and then reflecting the beam reflected by the second mirror with a first half-mirror, passing such reflected beam through a condensing lens and then reflecting it with a second half-mirror. The beam passing through the first half-mirror is received by a first photodiode, and the beam passing through the second half-mirror is received by a second photodiode, and prior to the use of the gas laser, deviation of the beam passing through the first half-mirror is detected via the first photodiode to eliminate such beam deviation via actuators, and deviation of the beam passing through the second half-mirror is detected by the second photodiode to eliminate such beam deviation via another actuator, so that the path of the beam reflected by the second half-mirror is corrected to a given path.

1 Claim, 1 Drawing Sheet

METHOD FOR CORRECTING THE PATH OF A GAS LASER BEAM

BACKGROUND OF THE INVENTION

1. Field of the Invention

The present invention relates to a method for correcting the path of a gas laser beam which can be used in argon ion gas lasers, etc., used in a laser exposure process for inscribing ultra-high-precision images in gravure printing plates, etc., or carving pits in CDs etc., using a gas laser.

2. Prior Art

Conventionally, devices which are used to inscribe ultra-high-precision images in gravure printing plates, etc., by means of an argon ion gas laser are constructed as follows:

A single laser beam is conducted over a distance of 1 meter or more along a path turning in various directions by reflection from a multiple number of lenses. This laser beam is directed at a prescribed angle of incidence into a beam splitter which consists of a multi-coated half-mirror with transmissivities that vary according to a numerical series, or a beam splitter which is formed by stacking a multiple number of half-mirrors whose transmissivities vary according to a numerical series, so that the laser beam is split into approximately 20 beams of equal intensity, which are arranged in a row in the form of a connected chain.

The system is designed so that each beam can be passed through a multi-type light modulator which is driven independently in accordance with the image data and an autofocus lens, and directed onto the image-receiving medium photosensitive drum or silver salt film wrapped on a drum. Laser exposure is performed while scanning this medium.

However, in the case of a beam output from a gas laser, the mirrors used for pumping at both ends of the plasma tube are slightly shifted when the temperature of the room in which the gas laser is installed changes, or when vibrations originating in the rotating image-receiving medium or optical system act on the mirrors. As a result, the path of the laser beam output from the gas laser shifts as the laser is used.

Although this discrepancy may be small at the mirrors located near the gas laser, the discrepancy increases with the distance from the laser and becomes large in the mirrors which are distant from the laser. Accordingly, the beam is shifted considerably from the center of any lens that it passes through, resulting in serious distortion of the beam.

Especially in the case of a beam splitter, an ultra-high degree of precision is required in the angle of incidence of the beam. If there is a discrepancy in the beam path, a chain-form overlapping of the beams cannot be obtained, and the quantity of light also becomes insufficient. As a result, satisfactory ultra-precise image formation cannot be obtained in such prior art laser exposure devices used for gravure images, etc.

SUMMARY OF THE INVENTION

The present invention was devised in light of the above described problems and disadvantages found in the prior art. Thus, the object of the present invention is to provide a method for correcting the path of a gas laser beam which makes it possible to correct the path of the gas laser beam automatically prior to use.

The method of the present invention is characterized in that:

(a) a beam output by the gas laser is reflected by a first mirror which can be moved in very small linear motions and rotated through very small angles by a first actuator which is used for micro-linear positioning and a second actuator which is used for micro-rotational positioning;

(b) the beam reflected by the first mirror then reflected by a second mirror which can be moved in very small linear motions and rotated through very small angles by a third actuator which is used for micro-linear positioning and a fourth actuator which is used for micro-rotational positioning; and (c) the beam reflected by the second mirror is then reflected by a first half-mirror, passed through a condensing lens and reflected by a second half-mirror; wherein, (1) the beam which passes through the first half-mirror is received by a first four-section photodiode and the beam which passes through the second half-mirror is received by a second four-section photodiode, and (2) prior to the use of the gas laser L, (2-i) the deviation of the beam which has passed through the first half-mirror is detected by means of the first four-section photodiode so as to eliminate the deviation of such beam via either the first actuator or the third actuator, and (2-ii) the deviation of the beam which has passed through the second half-mirror is detected by means of the second four-section photodiode so as to eliminate the deviation of such beam via either the second actuator or the fourth actuator, so that the path of the beam reflected by the second half-mirror is corrected to a given path.

The beam output by the gas laser is successively reflected by the first mirror, second mirror, first half-mirror, and second half-mirror, and the beam finally reflected by the second half-mirror is corrected to a given path. This correction is accomplished as follows: the deviation of the beam which has passed through the first half-mirror is received and detected by the first four-section photodiode, and the deviation of the beam which has passed through the second half-mirror is received and detected by the second four-section photodiode. Based upon these deviations, the four actuators are controlled so that the first mirror and second mirror are shifted or rotated, thus correcting the path of the beam, which has reflected by the second half-mirror, to a given path.

The deviation of the beam which has passed through the first half-mirror is detected by the first four-section photodiode. At least either one of the first and third actuators are appropriately driven in accordance with this deviation, so that the first mirror and/or second mirror are caused to move linearly a very small amount, thus effecting a correction. If no condensing lens were present (between the first and second half-mirrors), the amount of this correction would be equal to the amount of change detected by the second four-section photodiode before and after said correction. However, since the condensing lens 8 is present (between the first and second half-mirrors), the amount of change, which has been multiplied by the condensing factor of the condensing lens, is smaller or minimized.

Deviation of the beam which has passed through the second half-mirror is detected by the second four-section photodiode. At least either one of the second and fourth actuators are then driven in accordance with this deviation, so that the first mirror and/or second mirror are caused to rotate through a very small angle, thus effecting correction. With regard to the amount of correction, since this amount of correction swings the beam,) the amount of change detected by the first four-section photodiode before and after correction would still be small even if no condensing lens were present; however, since the condensing lens is present, the amount of change, which has been multiplied by the condensing factor of the condensing lens, becomes an even smaller amount.

If the corrections are alternately repeated, the beam bath is fixed so that the deviation of the beam detected by the first four-section photodiode and the deviation of the beam detected by the second four-section photodiode become zero.

Accordingly, the path of the beam reflected by the second half-mirror is precisely corrected to a given path.

DETAILED DESCRIPTION OF THE PRESENT INVENTION

Figure 1:
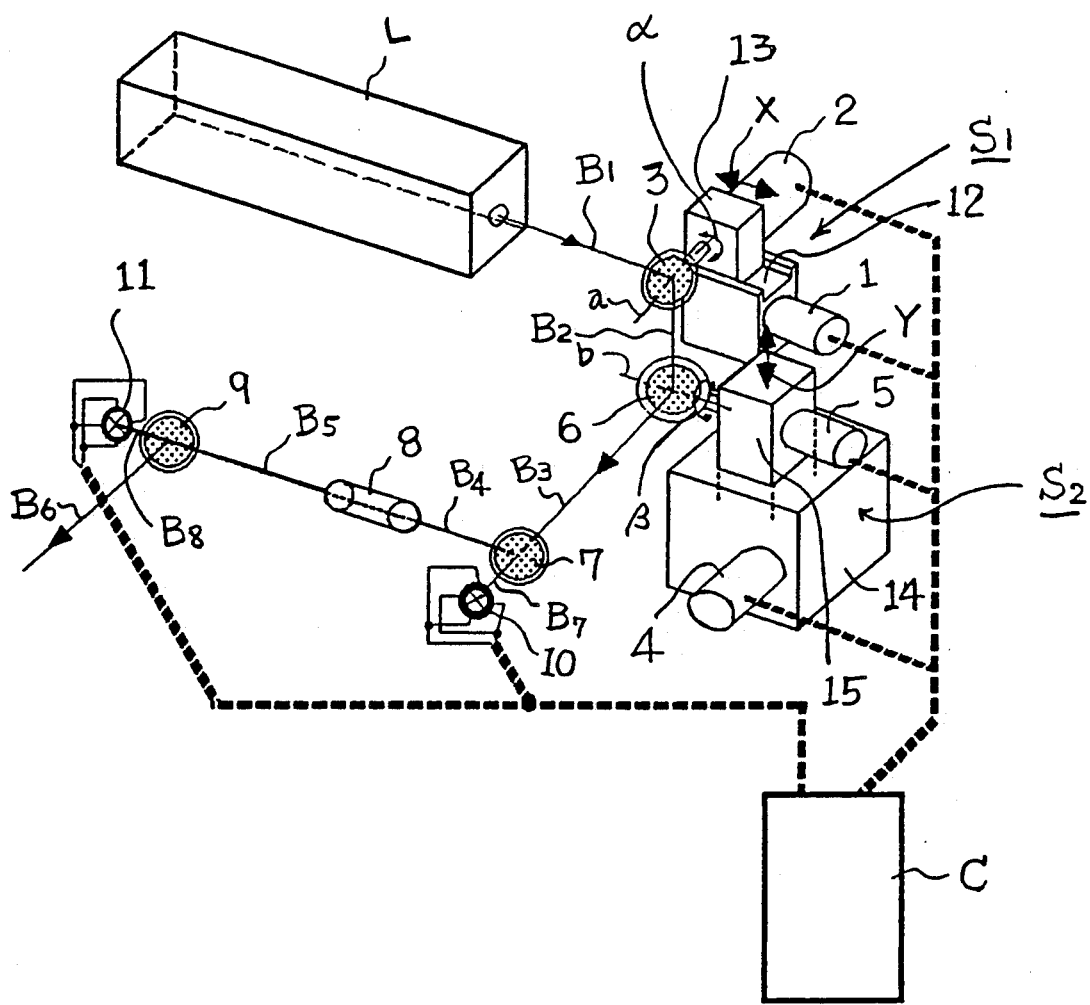
FIG. 1 is a perspective view of a gas laser output apparatus which is used to illustrate schematically the method of the present invention.

A detailed description of the present invention will now be described with reference to the apparatus which performs the method of correcting the path of a laser beam.

A beam B1 output in a horizontal direction by a gas laser L is reflected perpendicularly downward by a first mirror 3 which is installed in a first stage S1. This first stage S1 consists of a combination of a linear table device 12 and an indexing table 13.

The linear table device 12 has a table which is micro-driven in the direction indicated by the arrows X, using a first actuator 1 (a stepping motor is employed in this embodiment; however, micro-driving linear actuator such as a piezoelectric element, etc. could also be used) as a driving source. The indexing table device 13 has a table which is micro-rotated in the direction indicated by the arrows using a second actuator 2 (a stepping motor is used in this embodiment as a driving source). This indexing table device 13 is mounted on the table of the linear table device 12, and the first mirror 3 is supported on the table of the indexing table device 13.

The first mirror 3 in the first stage S1 is arranged so that it can be precisely positioned by being shifted in the direction of the axis of the beam B1 output by the gas laser L by means of the first actuator 1, and so that it can be precisely positioned in terms of a micro-angular position by being micro-rotated about axis a (axis a is perpendicular to the beam B1) by means of the second actuator 2. Thus, the mirror 3 reflects the beam B1, which is output in a horizontal direction by the gas laser L, perpendicularly downward.

The beam B2 reflected by the first mirror 3 is perpendicularly reflected by a second mirror 6 provided in a second stage S2, so that the beam B2 becomes beam B3 which is oriented in a horizontal direction. The second stage S2 consists of a combination of a linear table device 14 and an indexing table device 15.

The linear table device 14 has a table which is micro-driven in the direction indicated by the arrows Y using a third actuator 4 (a stepping motor is employed in this embodiment; however, a micro-driving linear actuator such as a piezoelectric element, etc., could also be used) as a driving source. The indexing table device 15 has a table which is micro-rotated in the direction indicated by the B arrows using a fourth actuator 5 (a stepping motor is used in this embodiment) as a driving source. The indexing table device 15 is mounted on the table of the linear table device 14, and the second mirror 6 is supported on the table of the indexing table device 15.

The second mirror 6 is arranged so that it can be precisely positioned by being shifted in the direction of a beam axis of the beam B2 reflected by the first mirror 3 by means of the third actuator 4 and so that it can be precisely positioned in terms of micro-angular position by being micro-rotated about axis b (axis b is parallel to the beam B1 output by the gas laser L) by means of the fourth actuator 5. Thus, the mirror 6 reflects the beam B2 reflected by the first mirror 3 in a horizontal direction perpendicular to the beam B1.

The beam B3 reflected by the second mirror 6 is perpendicularly reflected by a first half-mirror 7 which has a reflectivity of 95 to 99%, so that the beam B3 becomes beam B4 which is oriented in a horizontal direction. The extremely weak beam B7 which passes through the first half-mirror 7 is received by a first four-section photodiode 10. In this case, the first four-section photodiode 10 is installed so that the two beams B3 and B7 are correlated so that the beam B7 strikes the center of the first four-section photodiode 10 when the beam B3 strikes the center of the first half-mirror 7. Furthermore, the first four-section photodiode 10 is installed so that the four light-receiving surfaces thereof are arranged in an above-below/right-left configuration.

When deviation occurs so that the beam B7 strikes either the left or right light-receiving surface of the first four-section photodiode 10, the first actuator 1 is appropriately driven by a controller C so that the first mirror 3 is shifted by a very small amount in the horizontal direction indicated by the arrows X, thus eliminating deviation. Furthermore, when deviation occurs so that the beam B7 strikes either the upper or lower light-receiving surface of the first four-section photodiode 10, the third actuator 4 is driven by the controller C so that the second mirror 6 is shifted by a very small amount in the vertical direction indicated by the arrows Y, thus eliminating any deviation.

The beam B4 reflected by the first half-mirror 7 is condensed by a condensing lens 8 so that the beam B4 is converted into a beam B5 that is ¼ to 1/5 the diameter of beam B4. Afterward, this beam B5 is perpendicularly reflected by a second half-mirror 9 which has a reflectivity of 95 to 99%, so that the beam B5 becomes beam B6 which is oriented in a horizontal direction. The extremely weak beam B8 which passes through the second half-mirror 9 is received by a second four-section photodiode 11. In this case, the second four-section diode 11 is installed so that the two beams B5 and B8 are correlated so that the beam B8 strikes the center of the second four-section photodiode 11 when the beam B5 strikes the center of the second half-mirror 9. Furthermore, the second four-section photodiode 11 is installed so that the four light-receiving surfaces thereof are arranged in an above-below/left-right configuration.

When deviation occurs so that the beam B8 strikes either the left or right light-receiving surface of the second four-section photodiode 11, the second actuator 2 is driven by the controller C so that the first mirror 3 is rotated through a very small angle in the direction indicated by the arrows, thus eliminating deviation. Furthermore, when deviation occurs so that the beam B8 strikes either the upper or lower light-receiving surface of the second four-section photodiode 11, the fourth actuator 5 is driven by the controller C so that the second mirror 6 is rotated through a very small angle in the direction indicated by the arrows, thus eliminating any deviation.

The controller C corrects deviation of the beam B7 and deviation of the beam B8 prior to use of the laser apparatus so that the path of the final reflected beam B6 is precisely corrected to a given path.

Operation of the present invention will be described below as follows:

When the gas laser L is switched on, the beam B1 output by the gas laser L is reflected vertically downward by the first mirror 3, and thus becomes beam B2. Next, this beam B2 is reflected by the second mirror 6 in a horizontal direction perpendicular to the beam B1, so that the beam B2 becomes B3. This beam B3 is perpendicularly reflected in a horizontal direction by the first half-mirror 7, thus forming beam B4. This beam B4 is condensed by the condensing lens 8 to form beam B5, which is then perpendicularly reflected in a horizontal direction by the second half-mirror 9 to form beam B6.

When deviation of the beam B7 is detected by the first four-section photodiode 10, the first mirror 3 is shifted along the beam axis of the beam B1 output by the laser L by means of the first actuator 1, and/or the second mirror 6 is shifted along the beam axis of the beam B2 reflected by the first mirror 3 by means of the third actuator 4, so that deviation of the beam B7 detected by the first four-section photodiode 10 is eliminated.

When deviation of the beam B8 is detected by the second four-section photodiode 11 after the apparatus has been adjusted so that deviation of the beam B7 is eliminated, the first mirror 3 is rotated through a very small angle about axis a (axis a is perpendicular to the beam B1 output by the gas laser L) by means of the second actuator 2, and/or the second mirror 6 is rotated through a very small angle about axis b (axis b is parallel to the beam b1 output by the gas laser L) by means of the fourth actuator 5, so that deviation of the beam B8 detected by the second four-section photodiode 11 is eliminated.

As a result of the adjustment of the beam B8, a slight deviation is again generated in beam B7. Accordingly, an adjustment is again performed in order to eliminate this deviation of the beam B7. As a result of this adjustment, a slight deviation is again generated in the beam B8. Accordingly a further adjustment is performed in order to eliminate this deviation of the beam B8. As a result of these adjustments being alternately performed in this manner, the beam deviation detected by the first and second four-section photodiodes 10 and 11 are eliminated. Accordingly, the path of the beam B6 reflected by the second half-mirror 9, which is provided at the end of the line of mirrors, is corrected to a given path with ultra-high precision.

Furthermore, it is desirable to set the controller C so that the controller estimates in advance the amount of deviation that will be generated in the beam B7 by the adjustment that is performed in order to eliminate deviation of the beam B8, and then performs an adjustment in order to eliminate deviation of the beam B7.

As described above, the method of the present invention maintains a gas laser beam at maximum output and makes it possible to adjust the path of a gas laser beam automatically prior to use, and thus achieves the object of the present invention. Accordingly, by utilizing the method of the present invention, it is possible to obtain ultra-high-precision laser exposure devices which inscribe ultra-high-precision images in gravure plates, etc., using an argon ion gas laser.

I claim:

1. A method for correcting the path of a gas laser beam comprising the steps of:

reflecting a beam, which is output from said gas laser, by a first mirror which can be moved in very small linear motions and rotated through very small angles by a first actuator which is used for micro-linear positioning and by a second actuator which is used for micro-rotational positioning;

reflecting said beam, which has been reflected by the first mirror, by a second mirror which can be moved in very small linear motions and rotated through very small angles by a third actuator which is used for micro-linear positioning and by a fourth actuator which is used for micro-rotational positioning;

further reflecting said beam, which has been reflected by said second mirror, by a first half-mirror, passing such beam through a condensing lens and reflecting it by a second half-mirror; wherein, the beam which passes through said first half-mirror is received by a first four-section photodiode and the beam which passes through the second half-mirror is received by a second four-section photodiode, and prior to the use of said gas laser, the path of the beam reflected by said second half-mirror is corrected to a given path by detecting the deviation of the beam passing through said first half-mirror by means of said first four-section photodiode to eliminate said beam deviation by actuating either said first or third actuator, and detecting the deviation of the beam passing through said second half-mirror by means of said second four-section photodiode to eliminate said beam deviation by actuating either said second or actuator.

* * * * *